(12) United States Patent
Hinshaw et al.

(10) Patent No.: US 7,464,106 B2
(45) Date of Patent: *Dec. 9, 2008

(54) OPTIMIZED DATABASE APPLIANCE

(75) Inventors: Foster D. Hinshaw, Somerville, MA (US); John K. Metzger, Westborough, MA (US); Barry M. Zane, Wayland, MA (US)

(73) Assignee: Netezza Corporation, Framingham, MA (US)

( * ) Notice: Subject to any disclaimer, the term of this patent is extended or adjusted under 35 U.S.C. 154(b) by 394 days.

This patent is subject to a terminal disclaimer.

(21) Appl. No.: 11/332,704

(22) Filed: Jan. 13, 2006

(65) Prior Publication Data

US 2006/0129542 A1  Jun. 15, 2006

Related U.S. Application Data (63) Continuation of application No. 10/145,571, filed on May 13, 2002, now Pat. No. 7,010,521.

(51) Int. Cl.
*G06F 17/00* (2006.01)
(52) U.S. Cl. .................. 707/102; 707/100; 707/101
(58) Field of Classification Search ......... 707/100–102, 707/3
See application file for complete search history.

(56) References Cited

U.S. PATENT DOCUMENTS

| | | | |
|---|---|---|---|
| 4,817,035 A | | 3/1989 | Timsit |
| 5,442,791 A | | 8/1995 | Wrabetz et al. |
| 5,457,797 A | * | 10/1995 | Butterworth et al. ........ 719/320 |
| 5,495,601 A | | 2/1996 | Narang et al. |
| 5,537,533 A | | 7/1996 | Staheli et al. |
| 5,544,347 A | | 8/1996 | Yanai et al. |
| 5,586,315 A | | 12/1996 | Narang et al. |
| 5,832,486 A | | 11/1998 | Itoh et al. |

(Continued)

OTHER PUBLICATIONS

"The Berkeley ISTORE Project," http://istore/cs.berkeley.edu/, downloaded Dec. 10, 2001 (2 pp.).

(Continued)

*Primary Examiner*—Sana Al-Hashemi
(74) *Attorney, Agent, or Firm*—Hamilton, Brook, Smith & Reynolds, P.C.

(57) ABSTRACT

A system from processing database queries allows for cost and locale based distribution for execution of database queries. The database queries are executed on execution engines that provide flexible configuration and overlapping functionality. The system reduces various costs, including elapsed time, required to perform database queries. The system provides processing of a database query using a database catalog comprising database table locality information, record locality information and execution engine information. A query optimizer receives the query and accesses the database catalog to create a query execution plan comprising locality-based database operations. A central database operation processor providing a first execution engine executes the query execution plan by performing at least a portion of the locality-based database operations and distributing at least a portion of the locality-based database operations as a subplan. A second database operation processor providing a second execution engine executes the subplan received from the central database operation processor. At least one of the database operations can be executed on either the first execution engine or the second execution engine. A storage unit stores at least a portion of database tables and records. A data communications network connects the central database processor to the second database processor.

11 Claims, 8 Drawing Sheets

Basic Execution Plan

U.S. PATENT DOCUMENTS

| | | | |
|---|---|---|---|
| 5,857,180 | A | 1/1999 | Hallmark et al. |
| 5,884,299 | A | 3/1999 | Ramesh et al. |
| 6,026,379 | A | 2/2000 | Haller et al. |
| 6,112,281 | A | 8/2000 | Bamford et al. |
| 6,272,662 | B1 | 8/2001 | Jadav et al. |
| 6,282,610 | B1 | 8/2001 | Bergsten |
| 6,289,334 | B1 | 9/2001 | Reiner et al. |
| 6,304,874 | B1 | 10/2001 | Corley et al. |
| 6,308,169 | B1 | 10/2001 | Ronström et al. |
| 6,311,187 | B1 | 10/2001 | Jeyaraman |
| 6,314,417 | B1 | 11/2001 | Bennett et al. |
| 6,321,235 | B1 | 11/2001 | Bird |
| 6,351,749 | B1 * | 2/2002 | Brown et al. ............... 707/10 |
| 6,505,285 | B1 * | 1/2003 | Rabinovici et al. .......... 711/170 |
| 6,507,834 | B1 | 1/2003 | Kabra et al. |
| 6,507,934 | B1 * | 1/2003 | Smith ............................ 716/4 |
| 2002/0055937 | A1 | 5/2002 | Walther |

OTHER PUBLICATIONS

Brown, A. et al., "ISTORE: An Introspective Storage Architecture for Network Service Applications," http://istore.cs.berkeley.edu/talks/iram-jan99-retreat-istore-intro/sld001-015.htm, (downloaded Dec. 10, 2001) 15 pp.

Acharya, A. et al., "Active Disks: Programming Model, Algorithms and Evaluation," *Proceedings of the Eighth International Conference on Architectural Support for Programming Languages and Operating Systems* (Association for Computing Machinery), San Jose, CA Oct. 1998(11 pp.).

"Active Disks: Remote Execution for Network-Attached Storage," http://www.pdl.cmu.edu/Active/, downloaded Dec. 10, 2001 (9 pp.).

Keeton, K.K., "Computer Architecture Support for Database Applications," Doctoral dissertation, University of California at Berkeley, 1999 (217 pp.).

"WX/DES—Technical Information," *WhiteCross White Paper: R&D 99Q3-01*, May 25, 2000 (36 pp.).

Kang, S., and Moon, S., "Global Query Mangement in Heterogeneous Distributed Database Systems," *Microprocesssing and Microprogramming*, 38(1): 377-384 (1993).

* cited by examiner

Alternate Execution Plan #1

FIG. 6

Execution Plan Operations

- Restrict 350
- Scan 352
- Project 354
- Join 356
- Group 358
- Order 360
- Aggregate 362
- Save 364

Execution Plan Engines

- Programmable Execution Engine 270
- SPU Execution Engine 264
- Central Database Operation Processor Execution Engine 260

Reconfigured Execution Plan

OPTIMIZED DATABASE APPLIANCE

RELATED APPLICATION(S)

This application is a continuation of U.S. application Ser. No. 10/145,571, filed on May 13, 2002 now U.S. Pat. No. 7,010,521. The entire teachings of the above application is incorporated herein by reference.

BACKGROUND OF THE INVENTION

This invention relates generally to systems for processing database queries, and more specifically to systems for processing database queries by creating a distributed locality, cost-based execution plan.

Database management systems (DBMS) manage data records stored on storage devices. The data is often distributed across multiple storage devices organized by a server and accessible over a network. A client presents a query, the DBMS processes the query and returns results to the client. These systems suffer from performance problems related to processor speed, memory speed, disk access time and network bandwidth.

Attempts to solve the performance problem of query processing in a distributed database environment can be generally characterized by three approaches: "fat pipe", clustering and active disk.

The "fat pipe" solutions simply attempt to increase overall query processing performance by increasing the network bandwidth. No modification is made to the query processing itself, data and instructions just travel over a faster communications medium. Storage systems manufactured by EMC Corporation of Hopkinton, Mass. exemplify this approach.

Clustering of computers to perform database queries allows for parallel processing to occur. Parallel computer architectures generally fall into two categories: symmetric multiprocessing (SMP) and massively parallel processing (MPP). SMP systems contain multiple processors which share the same memory containing one copy of the computer application and data. SMP systems reduce transaction time by dividing computer operations into tasks which execute on assigned processors. MPP systems contain many processors, each with their own memory containing a copy of a portion or all of the computer application and/or data. Each processor can then work independently on its portion of the data to reduce overall transaction time. In database systems, data records can be striped across multiple disk drives connected to these clusters of computers. Each computer in a cluster can process parts of the database query on a group of data records that it has access to. Where "fat pipe" solutions attack the database query performance problem by increasing network bandwidth, clustering solutions attack the database query performance problem by increasing processing capacity. Oracle Corporation of Redwood Shores, Calif. provides an SMP clustering solution in its Oracle 8i database product.

A third approach to improving database query processing performance is "active disk" technology. Active disks combine computer processing with physically linked disk drives to provide parallel processing of database queries that also reduces the load on the communications network. This processing approach may be used to provide database management functionality on a processor closely linked to the database storage device. Conventional and proposed active disk systems only provide fixed functionality query processors and do not provide overlapping query processor functionality. Systems exemplifying this approach are described below.

A thesis by Eric Reidel entitled "Active Disks—Remote Execution for Network Attached Storage" (Technical Report CMU-CS-99-177, Pittsburgh, Pa., November 1999) describes disks with programmable processors. The thesis evaluates scan-based algorithms that allow for parallel processing of database queries. Reidel proposes a massively parallel processing (MPP) system using identical processors.

Another active disk system is described in a paper entitled "Active Disks: Programming Model, Algorithm and Evaluation" by Acharya (University of California Santa Barbara), Uysal (University of Maryland College Park) and Saltz (University of Maryland College Park) (Proceedings of the 8th International Conference on Architectural Support for Programming Languages and Operating Systems ASPLOS VIII, October 1998). The paper by Acharya et. al. describes a concept of moving processing closer to disks, but lacks a teaching of an overall database architecture outlining where and how all database operations are organized and optimally executed.

The 1999 doctoral dissertation by Kimberly Keeton of the University of California Berkeley, entitled "Computer Architecture Support for Database Applications" describes the concept of "intelligent disks" or "idisks" as an array of intelligent disk controllers. The idisks are user programmable processors and memory packaged on a disk storage device coupled to a high speed communications link. The idisks in the array can work together to provide parallel processing of database queries. Keeton only describes a single type of processor with non-overlapping functionality. Alternative future architectures are hinted at, but not enabled. Also at the University of California Berkeley research on introspective storage or "istore" has been done by David Patterson (http://istore.cs.berkeley.edu). Istore proposes the concept of intelligent disk "bricks" configured on a chassis having redundant components for "self-healing". Each brick comprises a CPU, memory, redundant network interfaces and a disk drive. The istore architecture is similar to Keeton's idisk architecture and suffers from many of the same deficiencies.

Commercial attempts to provide improved speed for processing database queries include a system sold by Teradata, a division of NCR Corporation. Teradata provides classic MPP database query processing systems having two classes of fixed function processors. The first class of processors are Access Module Processors (AMP) which execute queries in parallel. The AMPs access data on directly attached disk drives. The second class of processors are InterFace Processors (IFP). The IFPs parse, optimize and direct execution of the database queries executed on the AMPs. IFPs and AMPs are connected using a redundant, tree-shaped interconnect. The AMP/IFP architecture provides only one type of execution processor without overlapping functionality capability and no multiple locale optimization or execution options. Teradata has evolved the hardware-based AMP/IFP architecture into a hardware/software architecture with nodes running software versions of the AMP and IFP processors, but the AMP and IFP processes still are restricted to the fixed functionality of the hardware-based architecture. The software-based architecture also does not provide multiple locale optimization or execution options.

SUMMARY OF THE INVENTION

The present invention provides a system for processing database queries that allows for cost and locale based distributed execution of database queries on a parallel, multi-locale processing system. The database queries are processed on execution engines that provide flexible processor configuration and overlapping processor functionality. The system reduces various costs, including elapsed time, required to perform database queries.

The present invention provides a system for processing a query on a database having a database catalog comprising database table locality information, record locality information, execution engine information, and characteristics of the various system components such as processing capabilities and performance. A query optimizer receives the query and accesses the database catalog to create a query execution plan comprising locality-based database operations. A first execution engine associated with a central database operation processor executes the query execution plan by performing at least a portion of the locality-based database operations and distributing at least a portion of the locality-based database operations to a second database operation processor as a subplan. A second execution engine associated with a second database operation processor executes the subplan received from the central database operation processor. At least one of the database operations can be executed on either the central execution engine or the second execution engine. Data is stored on a storage unit connected to the second database operation processor which stores at least a portion of database tables and records. A portion of the database tables and records may also be stored on a storage unit connected to the central database operation processor. A data communications network connects the central database processor to the second database operation processor.

Configurations of the present invention allow for the execution engines to process data received from the storage unit or the data communications network as a data stream. An execution engine can comprise any combination of processing devices and any number of processing devices. In one embodiment of the present invention an execution engine comprises a general purpose CPU and a Field Programmable Gate Array (FPGA). Alternate configurations of the execution engines comprise various combinations of one or more of a general purpose CPU, an FPGA, an Application Specific Integrated Circuit (ASIC), a Digital Signal Processor (DSP), micro-controller, or other similar device. The processing devices can be arranged in a symmetric multiprocessing (SMP), massively parallel processing (MPP) or other configuration.

The present invention provides for many dynamic operations. In one particular embodiment, a query optimizer tracks performance results from queries and reallocates the database tables and records in order to create improved query execution. The execution engines dynamically track performance results from queries and modify the query execution plan to improve performance. The execution engines can also be dynamically reconfigured to process different database operations.

The present invention provides for storage units to be divided into sections and having locality information comprising: a section indicator indicating which section stores a database table, and a distribution indicator indicating whether the database table is striped or broadcast to the section.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
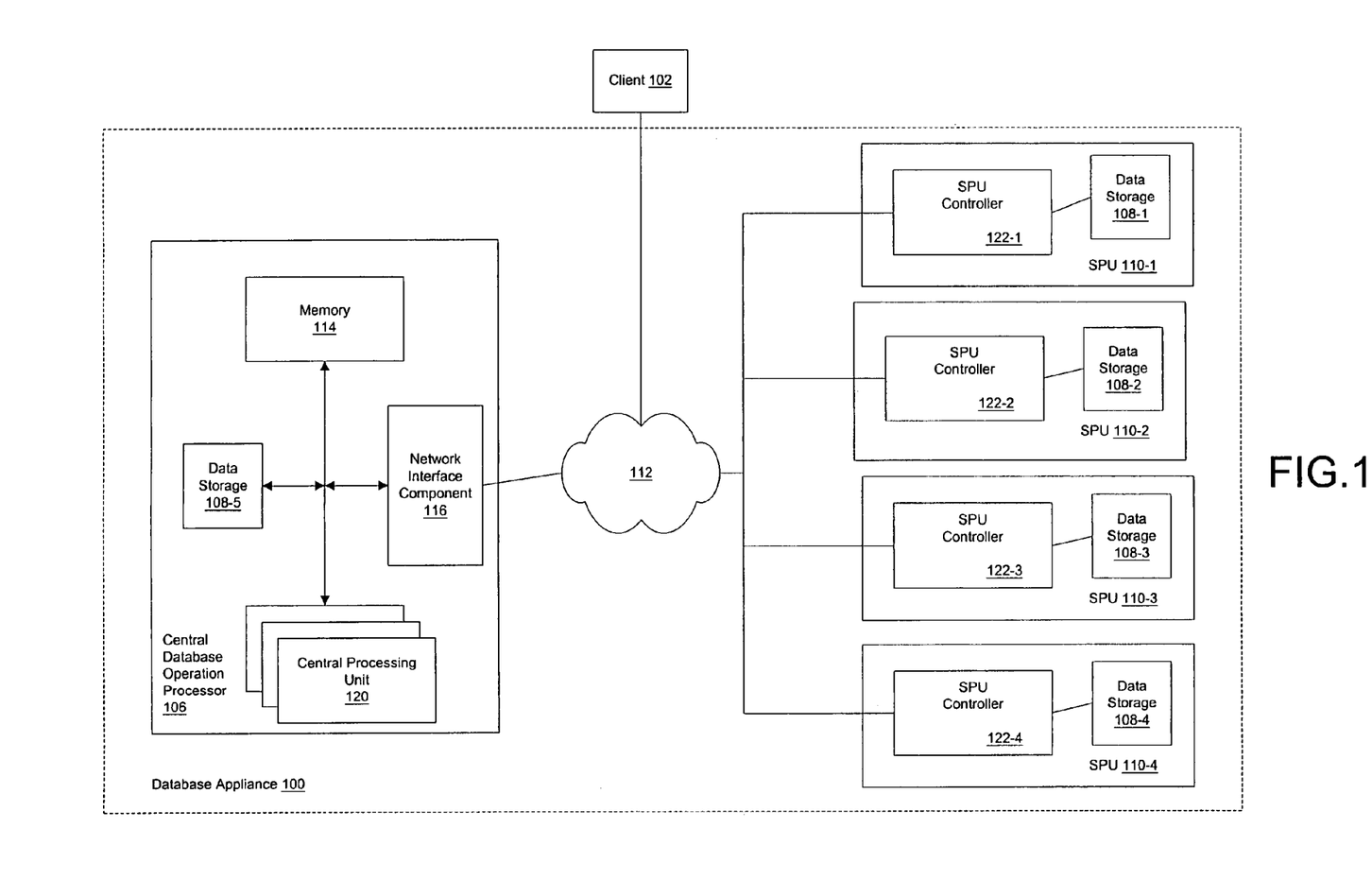
FIG. 1 is a block diagram of a database appliance configured according to the principles of the present invention.

FIG. 1 is a block diagram of a database appliance 100 configured according to the principles of the present invention. The database appliance 100 includes a central database operation processor 106 for processing database requests received from a client 102 and a plurality of data storage units 108 storing portions of the database. In an embodiment shown, the data storage units 108 are disk drives, but the invention may use any alternative data storage technology. Each of the plurality of storage units 108 is coupled to a respective Snippet Processing Unit Controller 122 or central database operation processor CPU 120. The storage units and Snippet Processing Unit Controller may be connected electrically, optically or by any other data connection technology. The central database operation processor may be a separate device or an SPU may serve as a central database operation processor.

In one embodiment, each Snippet Processing Unit (SPU) 110 includes a respective Snippet Processing Unit Controller 122 and a respective storage unit 108. In an alternative embodiment, each Snippet Processing Unit Controller 122 may be associated with more than one storage unit 108. Each SPU is coupled to the central database operation processor 106 through a data communication network 112. This array of SPUs can be considered an MPP configuration.

The central database operation processor manages tables for the database stored in the plurality of storage units. Routines for managing and accessing records stored in the database are stored in central database operation processor memory 114 and portions of the database can be copied from the storage units and stored in central database operation processor memory or local storage. The central database operation processor receives database queries from the client 102 transmitted over a data communications network 112. A network interface component 116 in the central database operation processor receives the database queries. A network interface component may be a network interface card, switch or router, Fibre Channel transceiver, InfiniBand-enabled device, or other device programmed to transmit and receive messages according to standardized data network protocols.

A Central Processing Unit (CPU) 120 in the central database operation processor processes a received database query and forwards pieces of a query execution plan through a network interface component 116 over the data communications network 112 to the SPU storing the requested record. In an alternative embodiment, there are multiple CPUs configured as an SMP array. The piece of the query execution plan forwarded to either the central database operation processor execution engine or SPU for processing is referred as to a "snippet". The snippet can include database operations such as join, sort, aggregate, restrict, reject, expression evaluation, statistical analysis or other operations. Database requests can be processed more efficiently by off-loading some of the processing from the central database operation processor to the SPUs.

Data records from one logical database table may be stored across multiple data storage units 108 using various distribution techniques. Storage units may be grouped into "sections," each section consisting of one or more storage units. Sectioning is a logical grouping that may vary from table to table, i.e., the sectioning scheme associated with a given table may differ from the sectioning scheme associated with another table. The data records may be replicated to all data storage units 108, in a broadcast fashion. Alternately, certain data records may be stored on specific data storage units 108 or sections, in a striping fashion. The stored data records may also be mirrored across multiple data storage units 108 or sections for improved reliability and performance. A portion of the database tables and records may also be stored on a storage unit connected to the central database operation processor. The distribution technique may vary from table to table.

Figure 2:
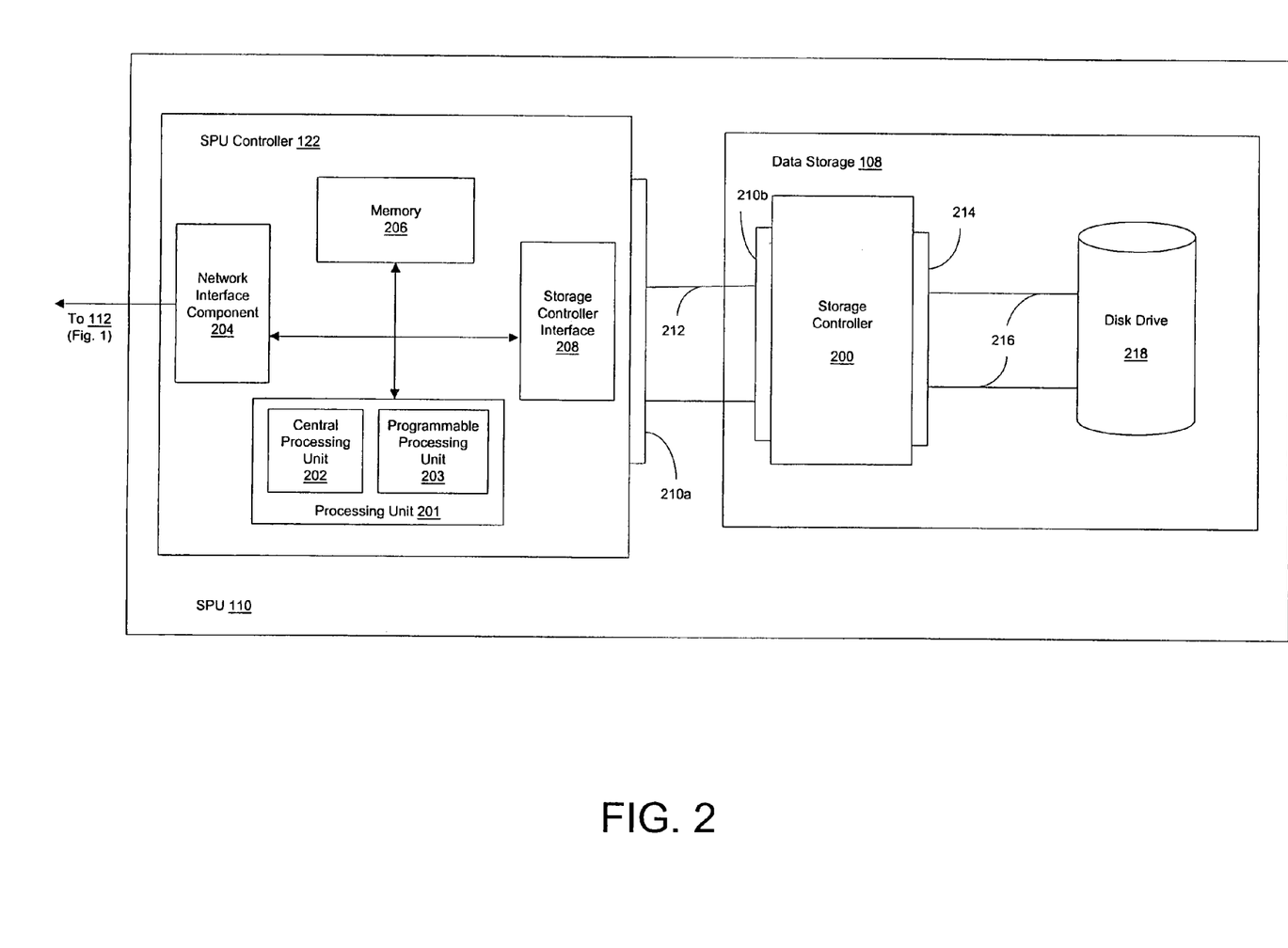
FIG. 2 is a block diagram of one of the Snippet Processing Units shown in FIG. 1.

FIG. 2 is a block diagram of one of the Snippet Processing Units 110 shown in FIG. 1. The SPU 110 includes memory 206, a processing unit 201, a network interface component 204 coupled to the data communication network 112 and a storage controller interface 208 (e.g., an IDE controller interface) coupled to a storage controller 200 (e.g., IDE disk drive controller). Processing unit 201 includes a central processing unit 202 and can also include a programmable processing unit 203. The SPU Controller 122 is coupled to data storage 108 through storage controller interface 208. Data storage 108 (e.g., a disk subsystem) contains a storage controller 200 and a disk drive 218. A connection 212 (e.g., disk cable) couples connector 210a on the SPU Controller to connector 210b on the storage controller 200. In one embodiment, the storage controller interface is the American National Standards Institute (ANSI) AT Attachment interface (ATA), commonly referred to as the Integrated Drive Electronics (IDE) interface. The disk drive 218 stores database records. In other embodiments, the data storage units 108 may be replaced by a storage subsystem utilizing technologies other than disk drives, such as random access memory.

Figure 3:
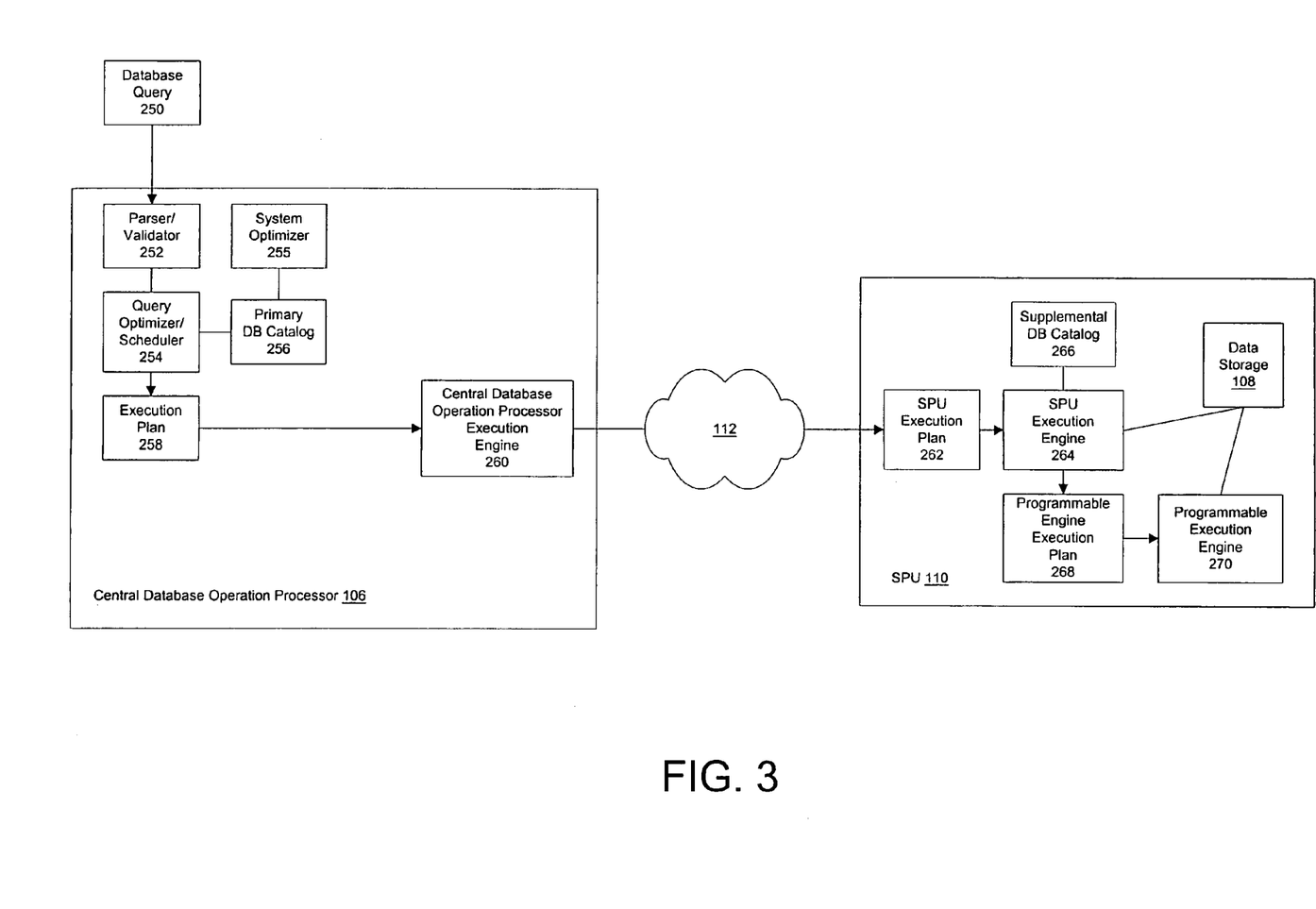
FIG. 3 is an illustration of the logical components of a database appliance configured according to the principles of the present invention.

FIG. 3 is an illustration of the logical components of a database appliance configured according to the principles of the present invention. A database query 250 is presented to central database operation processor 106. The database query 250 may be initiated by any conventional source, such as a user, an interactive database query, a call through an application programming interface (API) or a system function. A database query is an instruction to process a data retrieval, manipulation or definition operation on a database. A popular language for expressing database queries is the Structured Query Language (SQL). The following examples of database queries will use SQL, although the principles of the present invention allow for processing of a database query written in any language.

A central database operation processor 106 is connected to multiple SPUs 110 through data communications network 112. There can be multiple central database operation processors 106 and data communication networks 112 in a database appliance 100.

A parser/validator 252 parses and checks the syntax of the database query 250. If the syntax is correct a query tree is produced, otherwise an error is generated. A query optimizer 254 takes the query tree as input and generates an execution plan 258 using metadata from the primary database catalog 256. A system optimizer 255 monitors data storage and execution plan 258 history in order to update the primary database catalog 256. Parts, or snippets, of the execution plan 258 are distributed and executed on various execution engines (e.g., central database operation processor execution engine 260, SPU execution engine 264 and programmable execution engine 270) within database appliance 100. The results of executing the snippets are aggregated on a central database operation processor execution engine (e.g., central database operation processor execution engine 260) and made available for further processing (e.g., printing).

Query optimizer/scheduler 254 creates an optimal execution plan by combining possible ways of scanning and joining tables that appear in the database query 250 to achieve the desired result. The execution plan comprises basic database processing steps including: scan data, project, restrict, sort, hash, group, join, distribute, return, broadcast, etc. Each step can be comprised of multiple substeps. Each step is associated with a locale (i.e., an execution engine). The query optimizer/scheduler 254 then chooses the optimal execution plan based on the processing capabilities, performance characteristics and current workloads of various components and the locality of the data records within the database appliance 100. Query optimizer/scheduler 254 can alter the query tree both in form (adding, deleting, rearranging) database operations and in content (modifying) database operations, in addition to assigning operations to various execution engines. Query optimizer/scheduler 254 calculates the optimal query plan based on the lowest cost by considering possible steps, possible locales and data table access variants for each step of the execution plan.

Primary database catalog 256 stores the performance characteristics of the various components and the locality of the data records within the database appliance 100. Performance characteristics include, for example, availability of specific database operations on the execution engine, execution engine processor speed, execution engine processor cache configuration, data disk speed, data disk controller speed, data disk controller interface bandwidth, memory availability, memory speed, network interface controller speed and network interface bandwidth. Locality information includes, for example, database table definitions, storage methods and database record count statistics. Using these characteristics and locality information, query optimizer 254 can analyze the costs associated with various execution plans in order to choose the optimal plan. The optimal execution plan is generally considered to be the execution plan that will take the least elapsed time to complete. Other definitions of optimal (e.g., minimize I/O seeks or fabric traffic) are possible and the query optimizer 254 can be configured to create execution plans based on alternative definitions of optimal.

Execution plan 258 is comprised of various parts (snippets). Snippets represent one or more database operations (e.g., scan, restrict, project, join, etc.) and a locality designation (e.g., central database operation processor, SPU, etc.). The snippets are distributed to the various execution engines for processing and the results are aggregated at a designated central database operation processor execution engine. The ability to distribute the snippets to different execution engines provides for parallel processing of database query 250. Parallel processing reduces the elapsed time to process the database query 250.

System optimizer 255 monitors data storage usage and requirements. As execution plans 258 are executed statistics are gathered and maintained in primary database catalog 256. System optimizer 255 maintains various usage statistics in order that query optimizer 254 can adjust execution plans 258 for optimal execution. System optimizer 255 is also used to detect reallocation thresholds and participates in planning for reallocation of data when certain predefined thresholds are met.

System components can also dynamically reconfigure the execution plan created by the system optimizer and redirect operations to other components as needed. For example, if an SPU cannot perform an assigned operation for any reason (such as running out of memory), the SPU can change the assigned locality (e.g., to the central database operation processor) of that operation and any dependent subsequent operations in the execution plan. Similarly, a central database operation processor could direct operations to SPUs.

Central database operation processor execution engine 260 provides processing for database operations including the aggregation of data from other database operations. Central database operation processor 106 is connected to the SPU 110 through data communication network 112.

SPU 110 receives a SPU execution plan 262 containing database operations to be performed on data records stored on data storage units 108. SPU execution engine 264 executes the database operations and/or distributes them to a programmable execution engine 270. SPU execution engine 264 accesses a supplemental database catalog 266 to determine optimal distribution, in the same fashion the query optimizer 254 accesses primary database catalog 256. The resulting programmable engine execution plan 268 is then executed on programmable execution engine 270.

In one particular embodiment, the programmable execution engine 270 is a field programmable gate array (FPGA) configured specifically to perform certain database operations. Using input parameters, the FPGA can be reconfigured to perform various database operations selected from a set of preprogrammed operations. In another embodiment, programmable execution engine 270 is an application specific integrated circuit (ASIC) specifically configured to perform various database operations. Both the FPGA and ASIC implementations allow for increased speed in the execution of database operations as actual database instructions can be implemented in hardware/firmware. In other embodiments, various combinations of general purpose CPU, FGPA and ASIC, as well as other processing devices, can be used to implement the SPU execution engine 264 and programmable execution engine 270 without departing from the scope of the present invention.

The various execution engines within database appliance 100 provide for distributing database functionality in a flexible manner. Each execution engine can execute many different database operations. The configuration of the database engines is maintained in the database catalogs, thereby allowing the query optimizer 254 to adjust the generation of execution plans 258 as the configuration of the execution engines changes. This flexibility allows for the dynamic reconfiguration of database records and database operations to suit specific performance needs without affecting the underlying operation of query optimizer 254. In this way database operations are executed by the most appropriate execution engine. For example, for a given query, record scanning may be done on SPU execution engine 264, restriction operations may be done on programmable execution engine 270 and join operations may be done on central database operation processor execution engine 260.

The present invention provides overlapping functionality of database operations, as the various execution engines (central database operation processor execution engine 260, SPU execution engine 264, programmable execution engine 270) provide a subset of database operations. Because database appliance 100 provides for flexible distribution of database operation execution, multiple execution engines can provide overlapping functionality that is invoked based on external factors (e.g., data record layout, number of data records, performance characteristics of the execution engines, etc.).

Figure 4:
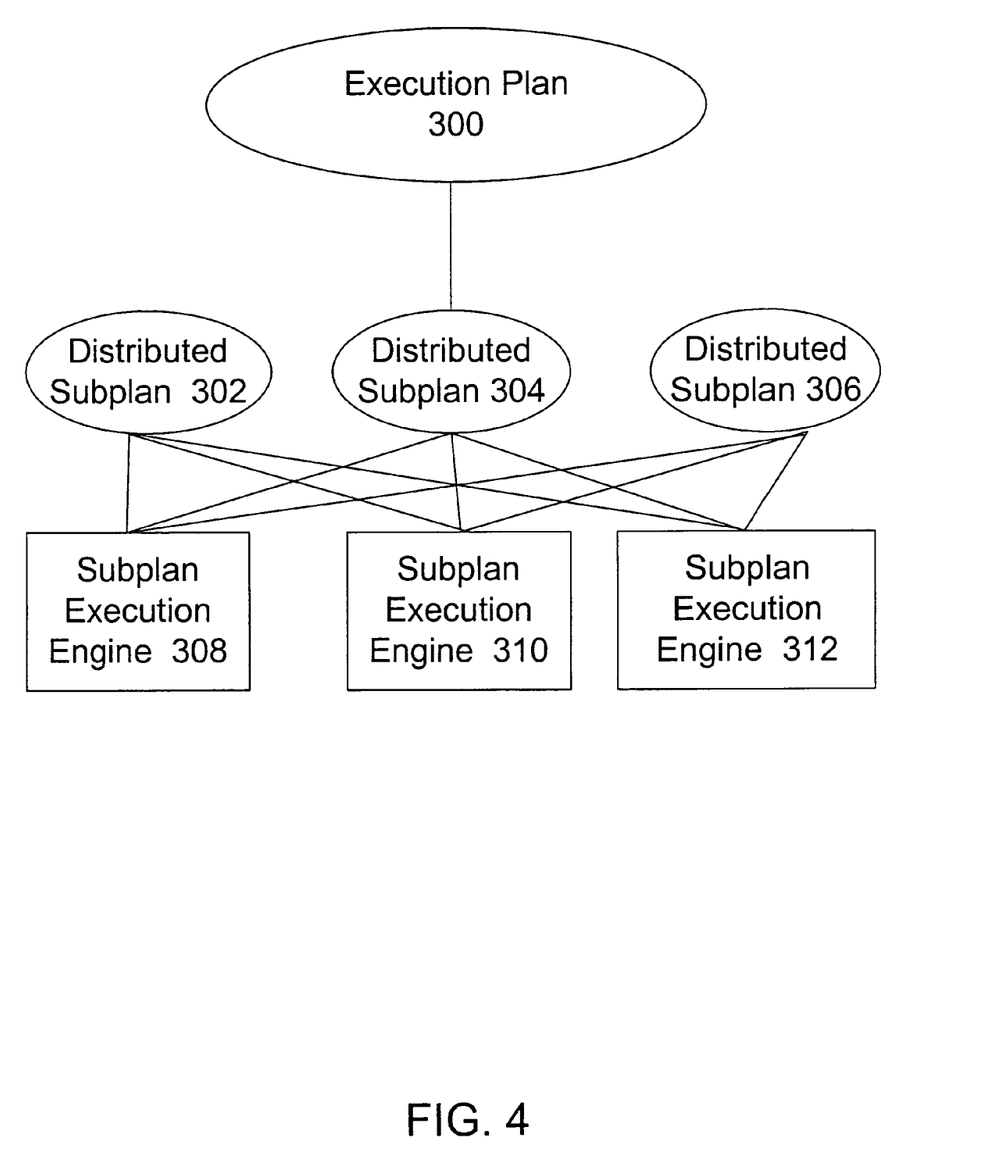
FIG. 4 is an illustration of the general execution plan distribution process.

FIG. 4 is an illustration of the general execution plan distribution process. Generally, an execution plan 300 is produced as the result of a database query being processed by a parser/validator and a query optimizer 254. The execution plan is then broken into execution subplans (e.g., distributed execution plan 302, distributed execution subplan 304 and distributed execution subplan 306). Because of the flexibility and overlapping functionality of database appliance 100 each execution subplan can be distributed and executed on a variety of subplan execution engines (e.g., subplan execution engine 308, subplan execution engine 310 and subplan execution engine 312).

Figure 5:
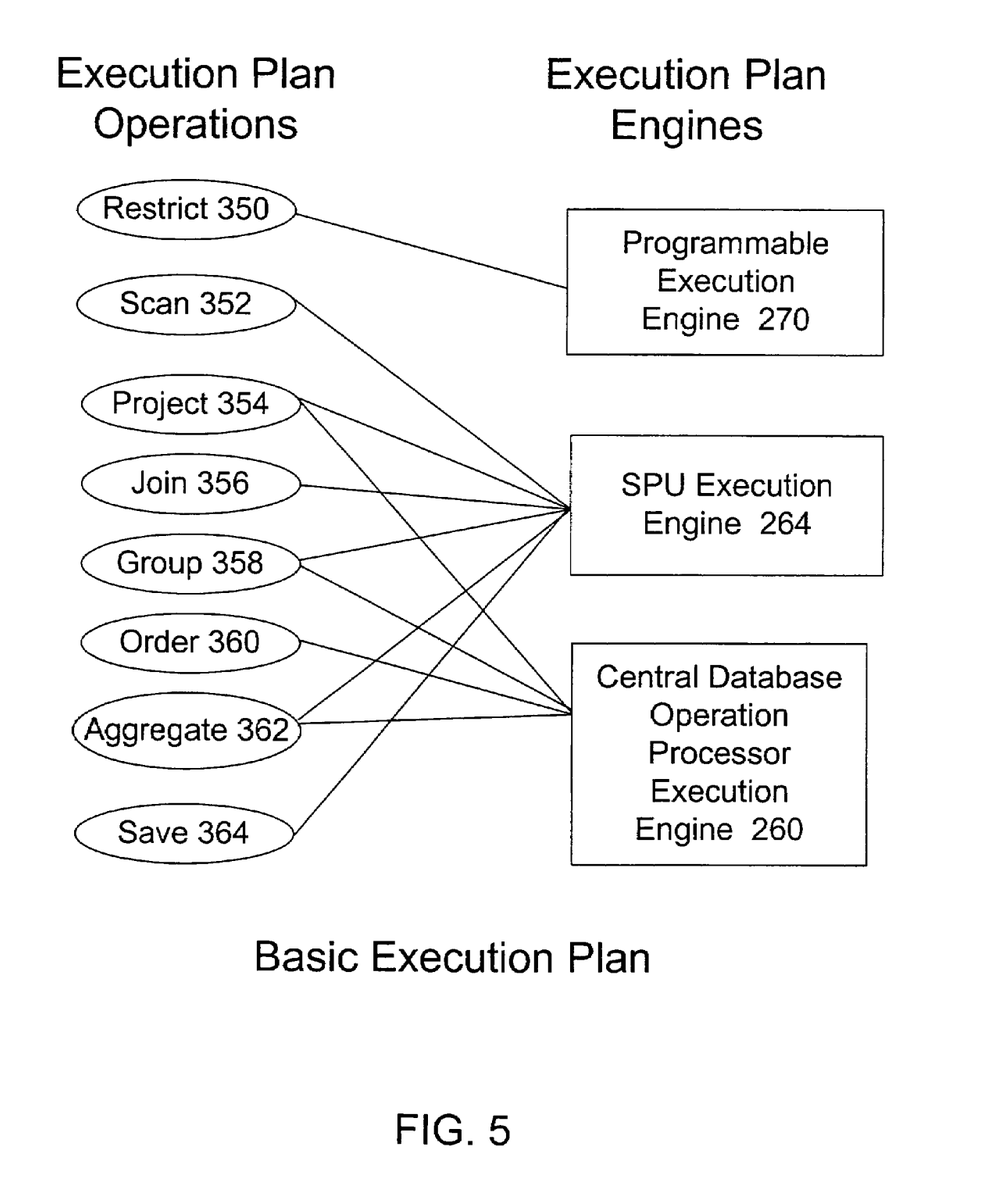
FIG. 5 is an illustration of the distribution of a basic execution plan.

As an aid in the illustration of a distribution of a basic execution plan a store sales database example will be presented that defines a Sales data table and a SalesDetail data table as follows:

Sales
TransactionID
SaleDate
StoreLocation
SalesDetail
TransactionID
ProductCategory
Units
Amount A sample query on the store sales database may be "show me the total units and dollar amount of rain gear sold in North Carolina in 2000, by month." This can be translated into the SQL statement:

SELECT Month(Sales.SaleDate) AS "Month",
Sum(SalesDetail.Units) AS "Sales units",
Sum(SalesDetail.Amount) AS "Sales amount"
FROM Sales, SalesDetail
WHERE Sales.TransactionID=SalesDetail.TransactionID
AND Sales.StoreLocation="NC" AND Year(Sales.SaleDate)="2000"
AND SalesDetail.ProductCategory="Raingear"
GROUP BY Month(Sales.SaleDate)

The output from the sample query showing the total units and dollar amount of rain gear sold in North Carolina in 2000 by month can be shown in tabular format:

| Month | Sales Units | Sales Amount |
|---|---|---|
| January | 1,300 | $45,000 |
| February | 1,200 | $41,000 |
| March | 1,800 | $60,000 |
| April | 3,500 | $98,000 |
| May | 4,200 | $112,000 |
| June | 5,000 | $150,000 |
| July | 4,700 | $143,000 |
| August | 4,100 | $104,000 |
| September | 3,600 | $101,000 |

-continued

| Month | Sales Units | Sales Amount |
|---|---|---|
| October | 2,000 | $65,000 |
| November | 1,200 | $41,000 |
| December | 1,500 | $43,000 |

In a particular embodiment, the database appliance 100 can be configured to provide for the distribution of database operation execution for this query as follows:

| Execution Engine | Database Operation |
|---|---|
| Central database operation processor execution engine (CDBP) 260 | GROUP 358, AGGREGATE 362, ORDER 360, PROJECT 354, JOIN 356, SAVE 364 |
| SPU execution engine (SPU) 264 | SCAN 352, PROJECT 354, JOIN 356, GROUP 358, SAVE 364 |
| Programmable execution engine (PXE) 270 | RESTRICT 350 |

FIG. 5 is an illustration of the distribution of a basic execution plan. Using the above example a basic execution plan can be created by query optimizer 254 that performs joins on the SPU execution engine 264 and performs aggregate functions on the SPU execution engine 264 and central database operation processor execution engine 260, with restriction functions being performed on the programmable execution engine (PXE) 270.

Figure 6:
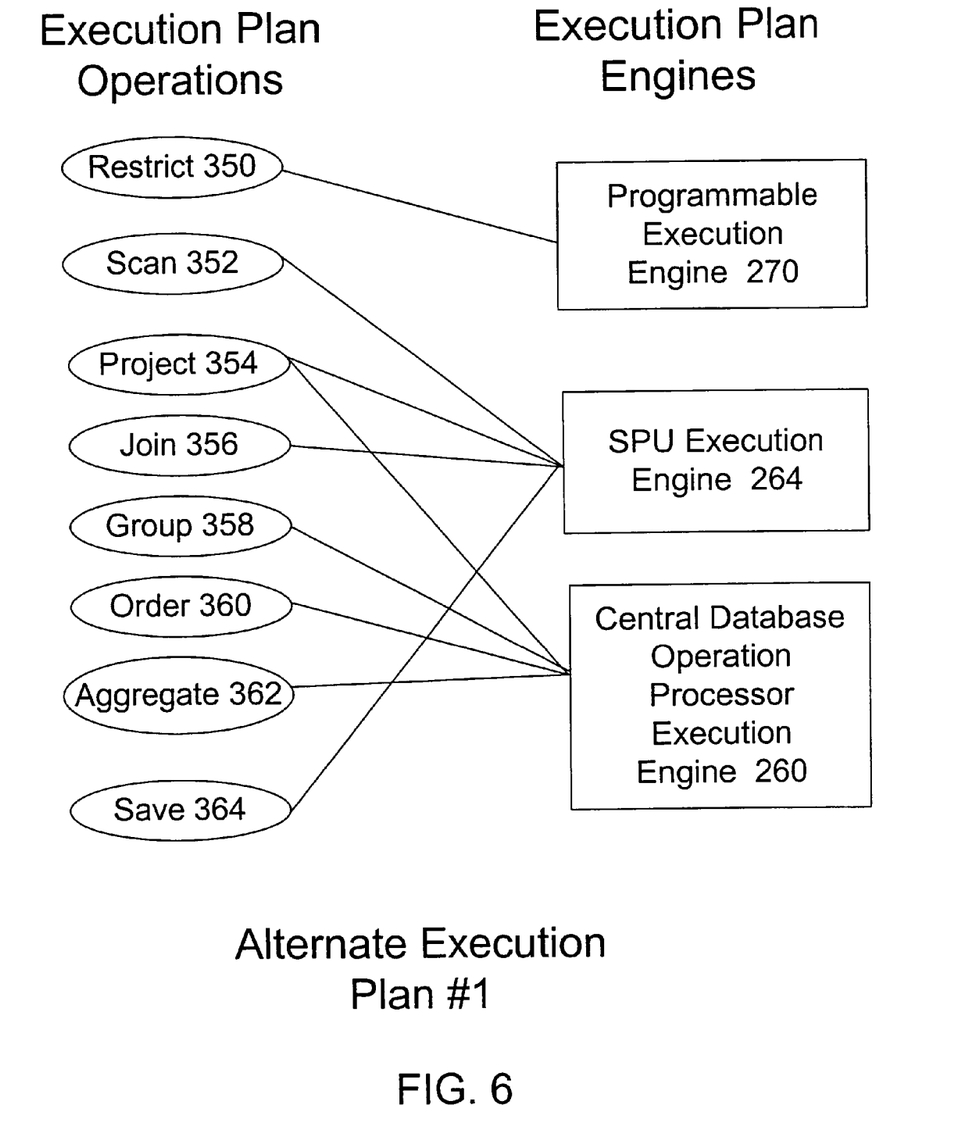
FIG. 6 is an illustration of an alternative distribution of a basic execution plan.

Locale Operation
SPU SCAN SaleDetail
PXE RESTRICT ProductCategory="Raingear"
SPU PROJECT TransactionID, Units, Amount
SPU SAVE As TEMPDetail
SPU SCAN Sale
PXE RESTRICT StoreLocation="NC" AND Year(SaleDate)="2000"
SPU PROJECT TransactionID, Month(SaleDate) As "Month"
SPU JOIN WITH TEMPDetail, TransactionID=TEMPDetail.TransactionID
SPU PROJECT Month, TEMPDetail.Units As "Units" TEMPDetail.Amount As "Amt"
SPU GROUP By Month
SPU AGGREGATE Sum(Units) As "Units", Sum(Amt) As "AmtTotal"
SPU RETURN
CDBP GROUP By Month
CDBP AGGREGATE Sum(Units) As "Sales Units", Sum(AmtTotal) As "Sales amount"
CDBP ORDER BY Month
CDBP PROJECT Month, "Sales Units", "Sales amount"
CDBP RETURN FIG. 6 is an illustration of an alternative distribution of a basic execution plan. Here joins are performed on the SPU execution engine 264 and aggregate functions are performed on the central database operation processor execution engine 260.

Figure 7:
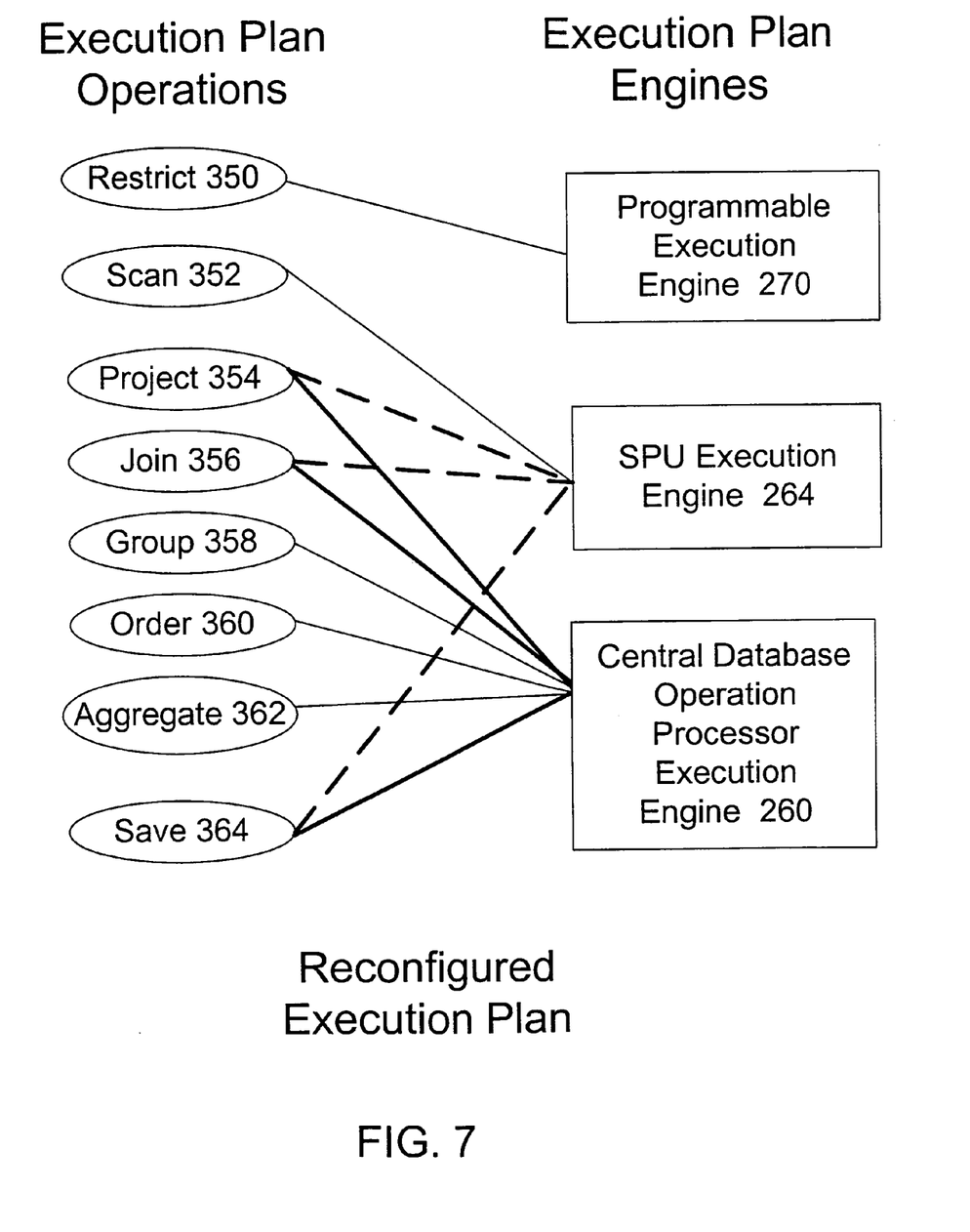
FIG. 7 is an illustration of a dynamically reconfigured execution plan.

Locale Operation
SPU SCAN SalesDetail
PXE RESTRICT ProductCategory="Raingear"
SPU PROJECT TransactionID, Units, Amount
SPU SAVE As TEMPDetail
SPU SCAN Sales
PXE RESTRICT StoreLocation="NC" AND Year(SaleDate)="2000"
SPU PROJECT TransactionID, Month(SaleDate) As "Month"
SPU JOIN WITH TEMPDetail, TransactionID=TEMPDetail.TransactionID
SPU PROJECT TransactionID,Month, TEMPDetail.Units As "Units",TEMPDetail.Amount As"Amt"
SPU RETURN
CDBP GROUP By Month
CDBP AGGREGATE Sum(Units) As "Sales Units", Sum(Amt) As "Sales amount"
CDBP ORDER BY Month
CDBP PROJECT Month, "Sales Units", "Sales amount"
CDBP RETURN FIG. 7 is an illustration of a dynamically reconfigured execution plan showing how a system component can dynamically reconfigure the execution plan described in conjunction with FIG. 6 in response to a problem. For purposes of this example, assume that, for this query, an SPU is unable to perform all of its assigned operations (e.g., due to running out of memory) and, as a result, redirects some operations to the central database operation processor.

Figure 8:
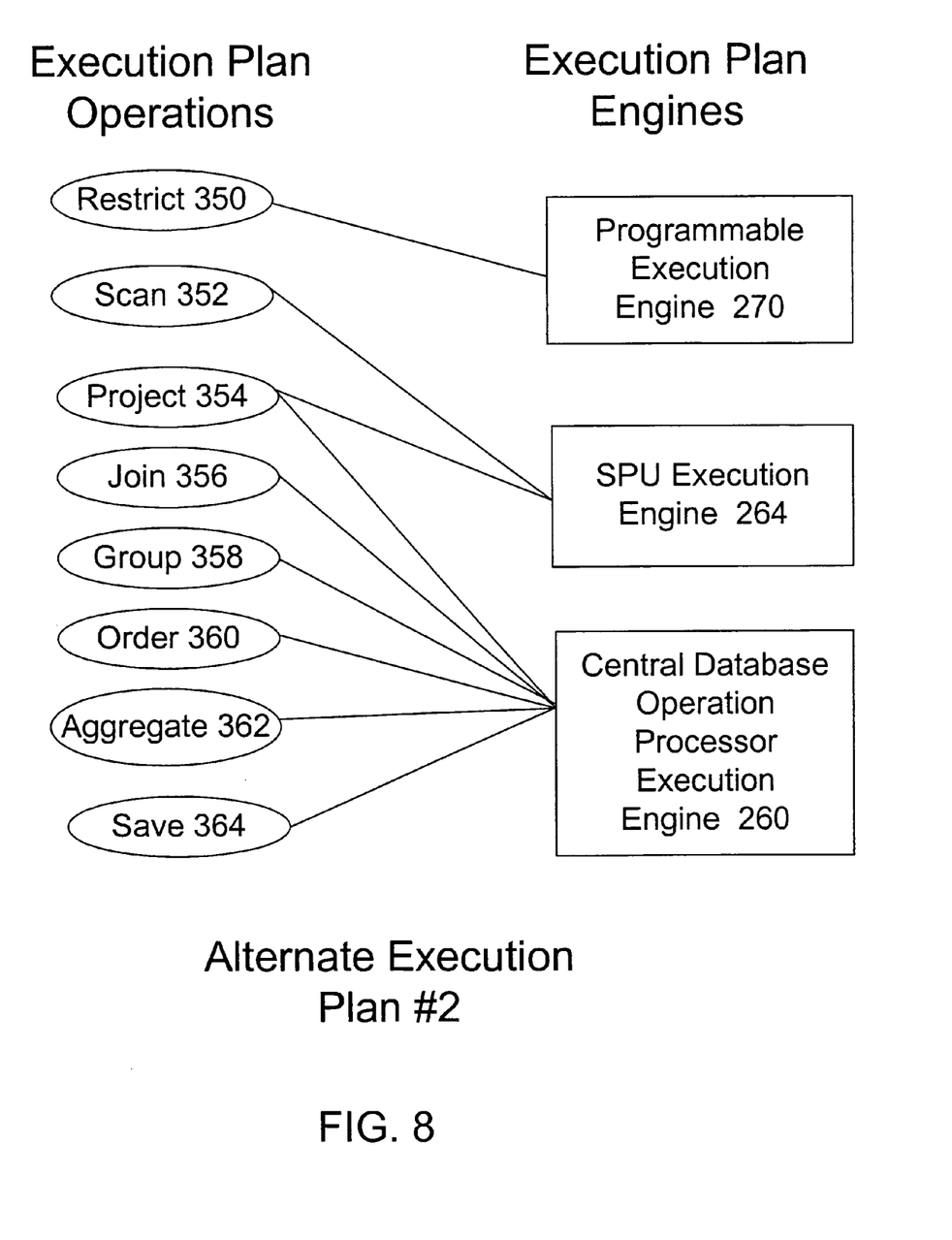
FIG. 8 is an illustration of another alternative distribution of a basic execution plan.

Locale Operation
SPU SCAN SalesDetail
PXE RESTRICT ProductCategory="Raingear"
SPU PROJECT TransactionID, Units, Amount
SPU SAVE As TEMPDetail {This operation fails due to lack of memory}
SPU RETURN
CDBP SAVE As TEMPDetail
SPU SCAN Sales
PXE RESTRICT StoreLocation="NC" AND Year(SaleDate)="2000"
SPU PROJECT TransactionID, Month(SaleDate) As "Month"
SPU RETURN
CDBP JOIN WITH TEMPDetail, TransactionlID=TEMPDetail.TransactionID
CDBP PROJECT TransactionID,Month, TEMPDetail.Units As "Units",TEMPDetail.Amount As"Amt"
CDBP GROUP By Month
CDBP AGGREGATE Sum(Units) As "Sales Units", Sum(Amt) as "Sales amount"
CDBP ORDER By Month
CDBP PROJECT Month, "Sales Units", Sales amount"
CDBP RETURN FIG. 8 is an illustration of another alternative distribution of a basic execution plan. Here join and aggregate functions are performed on the central database operation processor execution engine 260.

Locale Operation
SPU SCAN SaleDetail
PXE RESTRICT ProductCategory="Raingear"
SPU PROJECT TransactionID, Units, Amount
SPU RETURN
CDBP SAVE As TEMPDetail
SPU SCAN Sale
PXE RESTRICT StoreLocation="NC" AND Year(SaleDate)="2000"
SPU PROJECT TransactionID, Month(SaleDate) As "Month"
SPU RETURN
CDBP JOIN WITH TEMPDetail, TransactionID=TEMPDetail.TransactionID
CDBP PROJECT Month, TEMPDetail.Units As "Units", TEMPDetail.Amount As"Amt"

CDBP GROUP By Month
CDBP AGGREGATE Sum(Units) As "Sales Units", Sum(Amt) As "Sales amount"
CDBP ORDER BY Month
CDBP PROJECT Month, "Sales Units", "Sales amount"
CDBP RETURN While this invention has been particularly shown and described with references to preferred embodiments thereof, it will be understood by those skilled in the art that various changes in form and details may be made therein without departing from the scope of the invention encompassed by the appended claims. A database query is meant to encompass all data manipulation (e.g., select, insert, delete and update) and data definition (e.g., create table, drop table) instructions.

What is claimed is:

1. A system for processing a query on a database comprising:
    a plurality of database operation processor components, with at least two of the database operation processor components having different operation processing capabilities, and such that more than one database operation processor component is capable of executing a selected database operation;
    a database catalog comprising database table information, database operation processor component locale information, and database operation processor characteristic information;
    a query optimizer, running on a first database operation processor component, for receiving the query and accessing the database catalog to develop a query execution plan, the query execution plan defining a list of database operations to carry out the query, the query execution plan also defining a respective database operation processor component locale for each such database operation;
    wherein the first database operation processor component not only executes portions of the query execution plan designated to be handled itself, but also forwards at least a selected portion of the query execution plan to a second database operation processor component having different operation processing capabilities than the first database operation processor component; and
    wherein the second database operation processor component executes portions of the query execution plan designated for itself, and also forwards other selected portions of the query execution plan to a third database operation component for execution.

2. The system of claim 1 wherein the plurality of the database operation processor components further comprise:
    a central database operation processor comprising a first execution engine to provide a first one of the database operation components;
    a second database operation processor comprising a second execution engine to provide a second one of the database operation components;
    a storage unit storing at least a portion of database tables and records, connected to at least one of the central database operation processor and the second database operation processor; and
    a data communications network connecting the central database operation processor to the second database operation processor.

3. The system of claim 2 wherein the central database operation processor is configured as a symmetric multi-processing system and the second database operation processor is configured as a component of a massively parallel processing system.

4. The system of claim 2 wherein the first execution engine or the second execution engine processes data records received from the storage unit by performing one or more operations on the data records without materializing the data record into a memory.

5. The system of claim 2 wherein the first execution engine or the second execution engine processes data records received from the data communications network by performing one or more operations on the data records without materializing the data record into a memory.

6. The system of claim 2 wherein either the first execution engine or the second execution engine dynamically reconfigures an assigned execution subplan to redirect one or more operations to the third execution engine, so that the query execution plan is re-optimized while still being executed.

7. The system of claim 1 wherein the first database operation processor component, the second database operation processor component, and the third database operation processor component have different processing capabilities selected from a group of processing capabilities consisting of execution engine memory, execution engine processor speed, cache configuration, disk speed, disk controller speed, disk controller bandwidth, network interface bandwidth or network interface speed.

8. The system of claim 1 wherein the first database operation processor component or the second database operation processor component reconfigures an executing subplan.

9. The system of claim 1 wherein the first database operation processor component comprises a general purpose central processing unit.

10. The system of claim 1 wherein the second database operation processor component comprises an application specific integrated circuit.

11. The system of claim 1 wherein the third database operation processor component comprises a field programmable gate array.

* * * * *